(12) United States Patent
Oqab et al.

(10) Patent No.: US 11,821,367 B2
(45) Date of Patent: Nov. 21, 2023

(54) ENGINE PRODUCING THRUST USING AN INDUCTION HEATING ASSEMBLY TO ENERGIZE THE FUEL

(71) Applicant: OQAB DIETRICH INDUCTION INC., Kitchener (CA)

(72) Inventors: Haroon B. Oqab, Kitchener (CA); George B. Dietrich, Kitchener (CA)

(73) Assignee: Oqab Dietrich Induction Inc., Kitchener (CA)

( * ) Notice: Subject to any disclaimer, the term of this patent is extended or adjusted under 35 U.S.C. 154(b) by 249 days.

(21) Appl. No.: 17/273,234

(22) PCT Filed: Sep. 6, 2019

(86) PCT No.: PCT/IB2019/057548
§ 371 (c)(1),
(2) Date: Mar. 3, 2021

(87) PCT Pub. No.: WO2020/049528
PCT Pub. Date: Mar. 12, 2020

(65) Prior Publication Data
US 2021/0270210 A1  Sep. 2, 2021

Related U.S. Application Data

(60) Provisional application No. 62/727,860, filed on Sep. 6, 2018.

(51) Int. Cl.
*F02C 7/224* (2006.01)
*F03H 1/00* (2006.01)
(Continued)

(52) U.S. Cl.
CPC .............. *F02C 7/224* (2013.01); *F02C 7/22* (2013.01); *F02K 9/44* (2013.01); *F03H 1/0081* (2013.01);
(Continued)

(58) Field of Classification Search
CPC .... F02C 3/20; F02C 7/22; F02C 7/224; F03H 1/0081; F03H 1/0093
See application file for complete search history.

(56) References Cited

U.S. PATENT DOCUMENTS 3,150,483 A     9/1964   Mayfield et al.
3,215,572 A  *  11/1965  Papell ................. C06B 23/00
                                                 149/114
(Continued)

FOREIGN PATENT DOCUMENTS

DE    202012005955 U1   7/2012
EP          1209346 A3  12/2003
(Continued)

OTHER PUBLICATIONS

European Patent Office, Extended European Search Report for EP Patent App. No. 19857134.1, dated Apr. 20, 2022.
(Continued)

*Primary Examiner* — William H Rodriguez
(74) *Attorney, Agent, or Firm* — Own Innovation; James W. Hinton

(57) ABSTRACT

An example engine for producing thrust includes: a fuel supply to supply a fuel; a chamber fluidly coupled to the fuel supply to receive the fuel; an induction heating assembly operatively coupled to the chamber to inductively energize the fuel in the chamber; and an exhaust nozzle coupled to the chamber to receive energized fuel from the chamber to produce thrust.

23 Claims, 10 Drawing Sheets

(51) Int. Cl.
  *F02C 7/22* (2006.01)
  *F02K 9/44* (2006.01)
  *F02K 9/48* (2006.01)
  *F23R 3/28* (2006.01)
  *F02C 3/20* (2006.01)

(52) U.S. Cl.
  CPC .................. *F02C 3/20* (2013.01); *F02K 9/48* (2013.01); *F05D 2270/172* (2013.01); *F23R 3/28* (2013.01)

(56) References Cited

U.S. PATENT DOCUMENTS

| | | | | |
|---|---|---|---|---|
| 3,731,047 | A * | 5/1973 | Mullen | H05H 1/30 219/121.45 |
| 4,304,535 | A * | 12/1981 | Terauchi | F04C 18/0246 418/55.2 |
| 4,577,461 | A * | 3/1986 | Cann | B64G 1/406 219/121.49 |
| 5,170,623 | A | 12/1992 | Dailey et al. | |
| 5,560,844 | A * | 10/1996 | Boulos | H05H 1/28 219/121.52 |
| 6,193,194 | B1 | 2/2001 | Minovitch | |
| 6,361,393 | B1 * | 3/2002 | Seymour | F41B 6/00 446/34 |
| 6,378,290 | B1 | 4/2002 | Killinger et al. | |
| 6,419,538 | B1 * | 7/2002 | Diaz | H05H 1/24 60/202 |
| 6,449,941 | B1 * | 9/2002 | Warboys | H05H 1/54 60/202 |
| 6,644,014 | B2 | 11/2003 | Provitola | |
| 8,365,510 | B2 | 2/2013 | Lugg | |
| 8,373,103 | B2 | 2/2013 | Waldner | |
| 8,511,287 | B2 * | 8/2013 | Hofbauer | F02M 53/02 123/549 |
| 8,720,205 | B2 | 5/2014 | Lugg | |
| 9,383,100 | B1 * | 7/2016 | Russell | F23C 99/001 |
| 9,493,252 | B2 | 11/2016 | Tsay et al. | |
| 9,544,945 | B2 | 1/2017 | Hadoulias et al. | |
| 2005/0210862 | A1 | 9/2005 | Paterro | |
| 2005/0211229 | A1 * | 9/2005 | Pellizzari | F02M 31/16 123/549 |
| 2011/0057049 | A1 | 3/2011 | Hofbauer et al. | |
| 2015/0000251 | A1 | 1/2015 | Foret | |
| 2019/0154013 | A1 * | 5/2019 | Lazarev | H01G 4/40 |
| 2020/0300201 | A1 * | 9/2020 | Rodriguez | F02M 31/125 |
| 2022/0048126 | A1 * | 2/2022 | Oqab | B23K 1/002 |

FOREIGN PATENT DOCUMENTS

| | | | | |
|---|---|---|---|---|
| GB | 1557590 | | 12/1979 | |
| GB | 2312709 | A | 11/1997 | |
| JP | H11229965 | A | 8/1999 | |
| JP | 2001193565 | A | 7/2001 | |
| JP | 2001207913 | A | 8/2001 | |
| KR | 100956582 | B1 * | 5/2010 | |
| RU | 2637787 | C2 | 12/2017 | |
| WO | WO-2021028823 | A1 * | 2/2021 | ............. F01K 13/00 |

OTHER PUBLICATIONS

ISA/CA, International Search Report and Written Opinion, dated Jan. 14, 2020, re PCT International Patent Application No. PCT/IB2019/057548.

Japanese Patent Office, Notice of Reasons for Refusal for JP Patent App. No. 2021-537525 dated Apr. 12, 2023.

* cited by examiner

ENGINE PRODUCING THRUST USING AN INDUCTION HEATING ASSEMBLY TO ENERGIZE THE FUEL

FIELD OF THE INVENTION

The present disclosure relates generally to engines. More particularly, the present disclosure relates to an engine for producing thrust.

BACKGROUND

Engines or motors may be used in many types of transportation applications, to produce thrust. For example, internal combustion engines burn fuel to create heat which can be used to do produce the thrust.

SUMMARY

According to an aspect of the present specification, an engine includes a fuel supply to supply a fuel; a chamber fluidly coupled to the fuel supply to receive the fuel; an induction heating assembly operatively coupled to the heating chamber to inductively energize the fuel in the chamber; and an exhaust nozzle coupled to the chamber to receive energized fuel from the chamber to produce thrust.

According to another aspect of the present specification, a method in an induction engine includes, receiving, in a chamber (a combustion chamber) a fuel; inductively energizing the fuel using an induction heating assembly; and at an exhaust nozzle of the engine, producing thrust from the energized fuel.

DETAILED DESCRIPTION

The present disclosure provides an engine (also referred to as a reaction thruster) to provide thrust via the application of electromagnetic induction to energize a fuel. The engine includes a fuel supply, a chamber, an induction heating assembly, and an exhaust nozzle. The induction heating assembly inductively induces a magnetic field to induce eddy currents and/or hysteresis in the fuel to energize the fuel. The energized fuel is converted by the exhaust nozzle to produce thrust.

Figure 1:
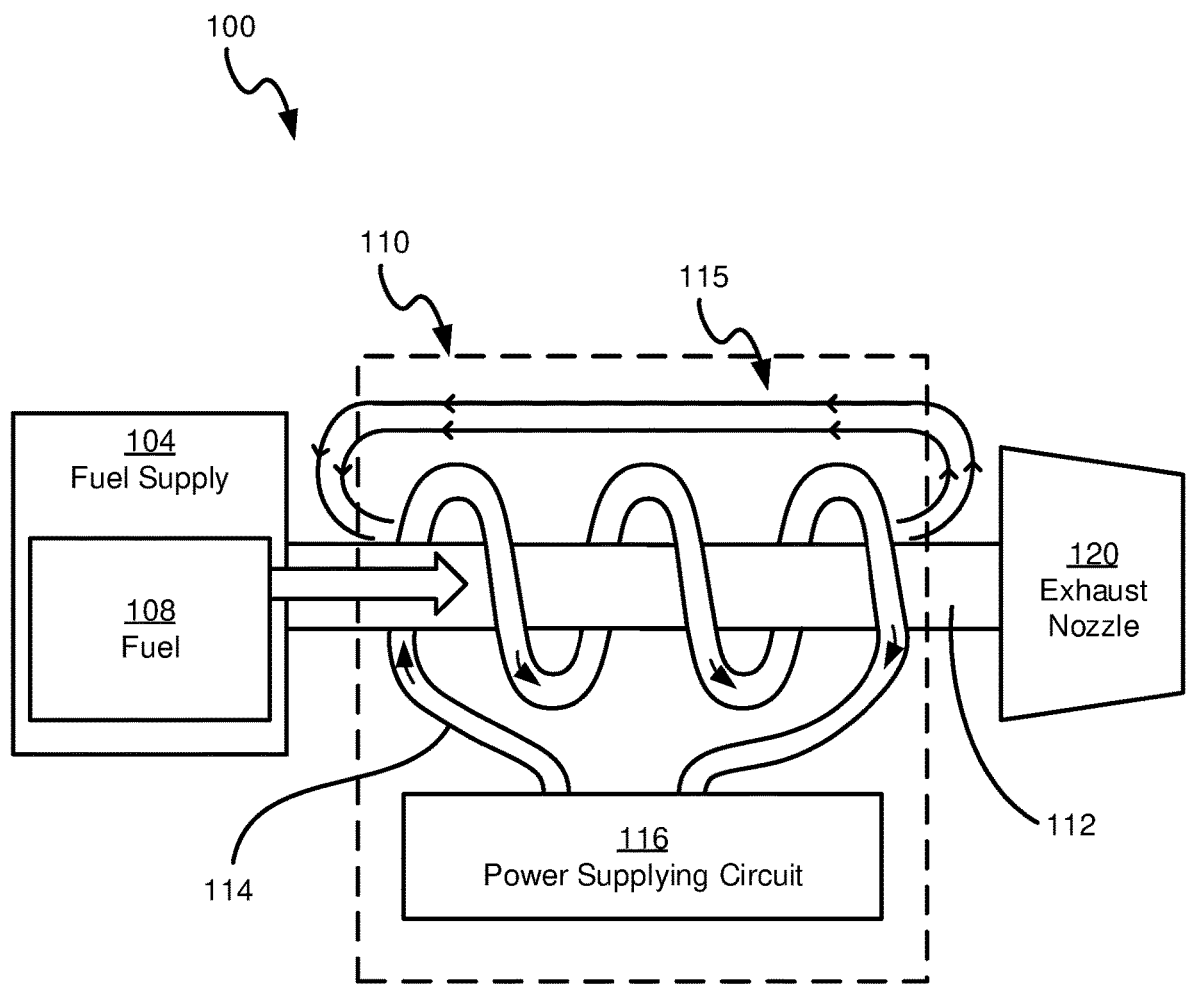
FIG. 1 shows a diagram of an example engine, according to a non-limiting embodiment.

FIG. 1 shows certain components of an engine 100 according to the present disclosure. The engine 100 is generally configured to energize fuel 108 for providing thrust. The engine 100 may be utilized, for example, in an aircraft system for providing thrust and lift to the aircraft system. In other examples, the engine 100 may be utilized in other systems, including, but not limited to, rockets, satellites, airships and dirigibles, automobiles, trains, watercraft, underwater systems, jetpacks, drones and other unmanned aircraft systems, impulsive drivers, and space systems.

The engine 100 includes a fuel supply 104 configured to supply the fuel 108, a chamber 112, an induction heating assembly 110 (also referred to herein as simply assembly 110) for energizing the fuel 108, and an exhaust nozzle 120 configured to produce thrust using the energized fuel.

Figure 2A:
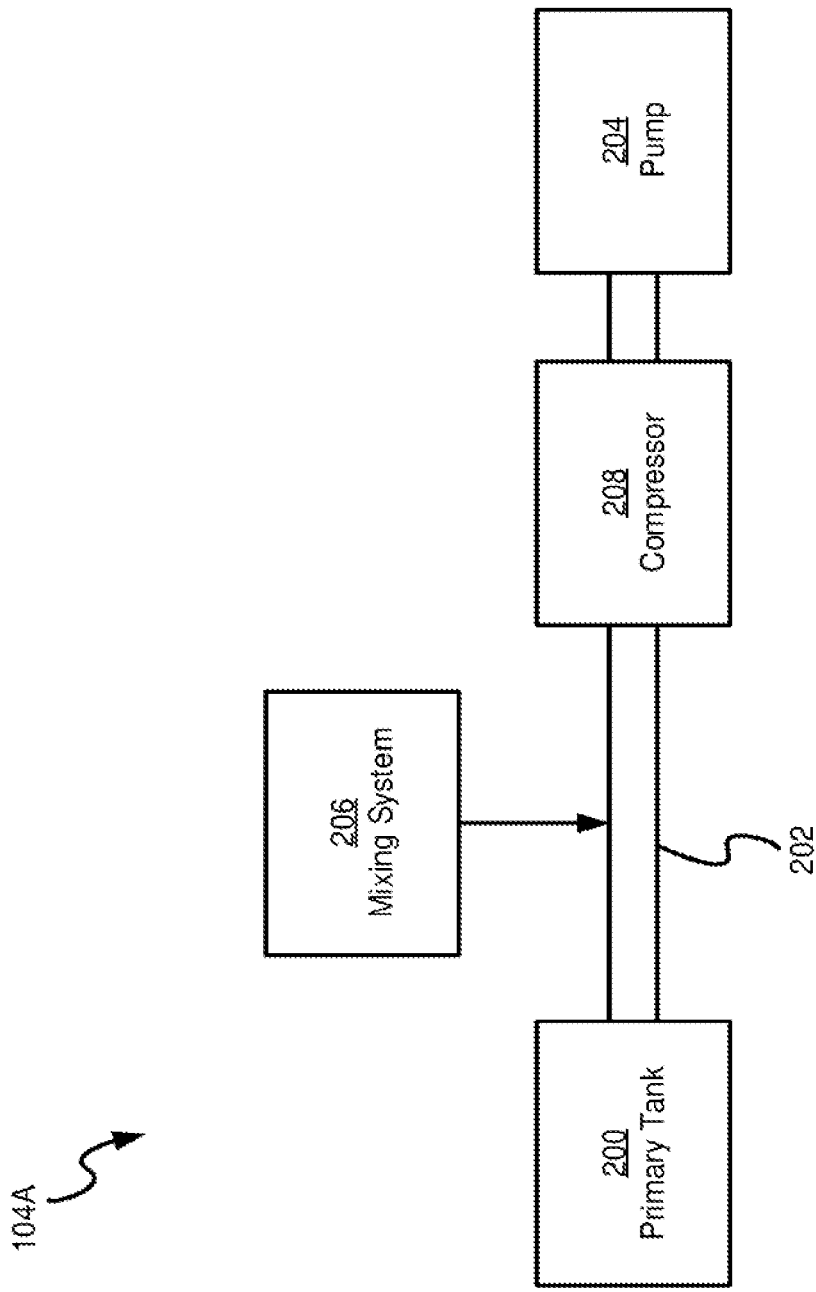
FIG. 2A shows a block diagram of an example fuel supply in the engine of FIG. 1.

The fuel supply 104 is generally configured to supply the fuel 108 to the assembly 110. For example, FIG. 2A depicts a fuel supply 104A including a primary tank 200 coupled to a pump 204 via a main line 202. The fuel supply 104A may further include a mixing system 206 and a compressor 208.

The primary tank 200 may be a container or the like, formed of metals, metal alloys, plastics, ceramics, combinations of materials, or the like. The primary tank 200 is generally configured to contain the fuel 108 for storage and to supply to other components of the engine 100. The tank 200 may be configured, for example, based on the type of fuel 108. The main line 202 may be, in some examples, ferromagnetic pipes which may be inductively heated, and which may be configured to heat the fuel 108 moving through the main line 202 using convection.

Generally, the fuel 108 is able to be heated inductively. For example, the fuel may be an electrically conducting fuel, such as a reactive metal compound. More particularly, the fuel may be a micro/nano-thermite including an oxidizer and a reducing agent (e.g. a metal and a metal oxide). In other examples, the fuel may be a ferrofluid, or other various types of fluids (including fuels, gases, and the like) containing electrically conducting particles or components. For example, the fuel 108 may include magnetic materials, gases, liquids, synthetic and non-synthetic polymers, hydrogels, thermo plastics, metamaterials and other nano-thermites, and in situ space resources, including a plurality of fuel sources found on celestial bodies, the Moon, Mars, other planets, asteroids, planetoids, and other celestial bodies, combinations of the above, and the like. The fuel 108 may further include a mixture of layers of materials, hybrid mixtures of reactive metal compounds in liquid and inert states, or other suitable combinations of fuels. More generally, fuel 108 may include multiple materials having different configurations, including, but not limited to, particle size, packing structure (e.g. simple cubic packing, face-centered cubic packing, hexagonal packing), different reaction temperatures, or otherwise different heating and combustion profiles. For example, the multiple materials may be combined in fuel 108 as different layers forming a shell, as a heterogenous or homogenous mixture or the like. Heating fuel 108 with different layers may produce different combustion profiles, and accordingly, different propulsion profiles.

The fuel supply 104A further includes the pump 204, which is coupled to the primary tank 200 via the main line 202. The pump 204 is generally configured to pump the fuel 108 from the main line 202 to be supplied to the chamber 112. The pump 204 may be, for example, a fluid pump, a metallic particle injector, an ejector system for ejecting micro/nano-thermites, or other suitable system. The specific components and operation of the pump 204 may be selected, for example, based on the type of fuel 108 contained in the primary tank 200.

The fuel supply 104A may further include the mixing system 206 coupled to the main line 202. The mixing system 206 may include one or more secondary tanks to contain secondary fluids. Each of the secondary tanks includes a corresponding control valve to control the flow of the secondary fluids to the main line. The secondary fluids may be electrically conducting fuels, such as reactive metal compounds, energetic composites, micro- and/or nano-thermites, ferro-fluids, fluids containing electrically conducting particles or components, gases liquids, synthetic and non-synthetic polymers, propellants, mixtures of layers of materials, hybrid mixtures of reactive metal compounds in liquid and inert states, poly-dispersed mixtures or other suitable combinations of fuels. In other examples, the secondary fluids may be catalysts to promote heating and/or combustion of the fuel 108. For example, the mixing system 206 may include a plurality of secondary fuels and a plurality of catalysts, which may be released in varying combinations to mix with the fuel 108 in the primary tank 200 to achieve different heating, combustion and propulsion profiles. In particular, the control valves may be operatively coupled to a processor to automatically control the flow of the secondary fuels and/or catalysts from the secondary tanks to the main line for mixing with the fuel 108 from the primary tank 200. In some examples, the mixing system 206 may further include a propeller or the like to facilitate mixing of the secondary fluids with the primary fuel.

The fuel supply 104A may further include the compressor 208. The compressor 208 is coupled to the main line 202 to compress the fuel 108 in the main line 202. In some examples, the compressor 208 may be located upstream from the mixing system 206 to compress the fuel 108 prior to mixing with the secondary fuels and/or catalysts from the mixing system 206, while in other examples, the compressor 208 may be located downstream from the mixing system 206 to compress the mixture of the fuel 108 with the secondary fuels and/or catalysts.

Figure 2B:
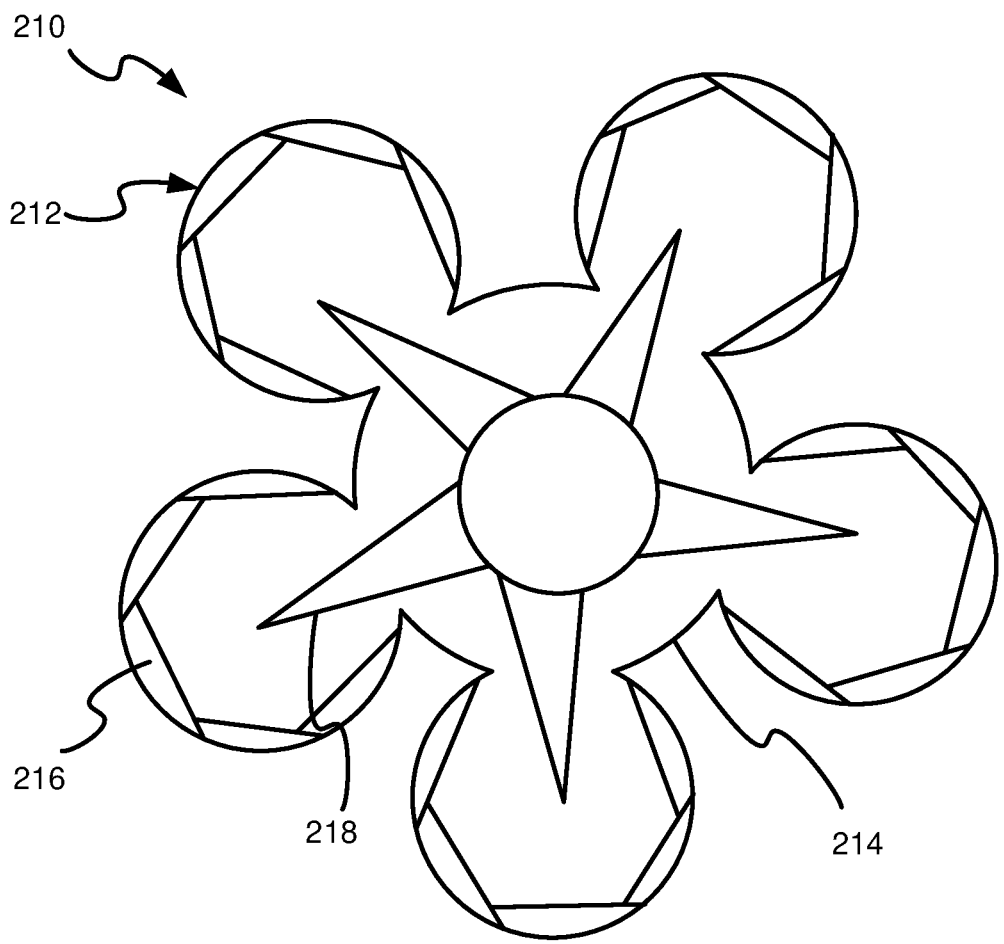
FIG. 2B shows a cross section of an example cyclonic convection compressor in the fuel supply of FIG. 2A.

The compressor 208 may be, for example, a cyclonic convection compressor. In particular, the cyclonic convection compressor may preheat the fuel 108 (e.g. nano-thermites) using convection. For example, referring to FIG. 2B, a cyclonic convection compressor 210 is depicted. The cyclonic convection compressor 210 includes a plurality of outer chambers 212 projecting from a central chamber 214. The outer chambers 212 may be formed from a flexible shell and include helical fins 216 to promote cyclonic motion of the fuel 108 in the cyclonic convection compressor 210. The cyclonic convection compressor 210 may further include wings 218 extending from the central chamber 214 to the outer chambers 212 to promote the cyclonic motion of the fuel 108.

Figure 2C:
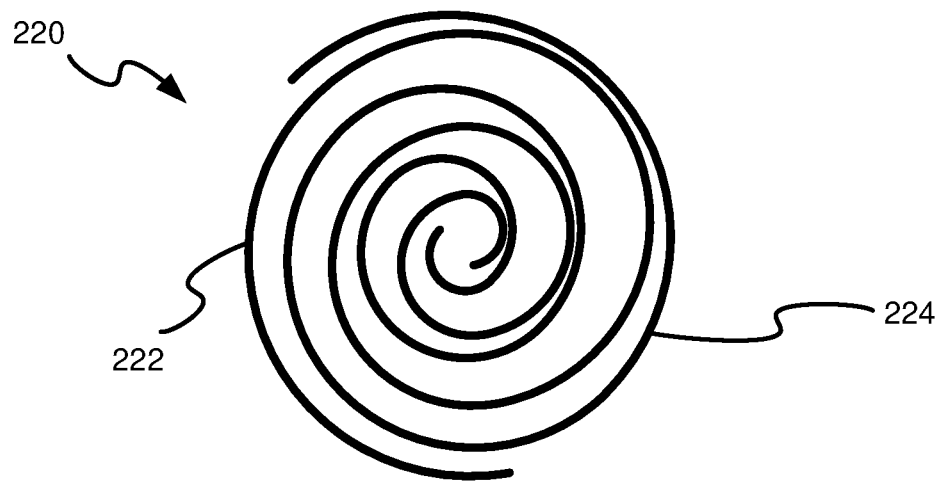
FIG. 2C shows a cross section of an example scroll compressor in the fuel supply of FIG. 2A.

In other examples, the compressor 208 may be a scroll compressor. For example, referring to FIG. 2C, a scroll compressor 220 is depicted. The scroll compressor 220 includes a fixed scroll 222 and an orbiting scroll 224. The scrolls 222 and 224 may be made of metals that may be heated using induction. The fuel 108 may flow through the scroll compressor 220 to compress the fuel 108, for example, to increase the temperature and induce a change of state in the fuel 108. In some examples, the scroll compressor 220 may be utilized in conjunction with the cyclonic convection compressor 210 in the central chamber 214 of the cyclonic convection compressor 210.

In still further examples, other suitable compressors 208 to compress the fuel 108 in the main line 202 are contemplated.

Figure 2D:
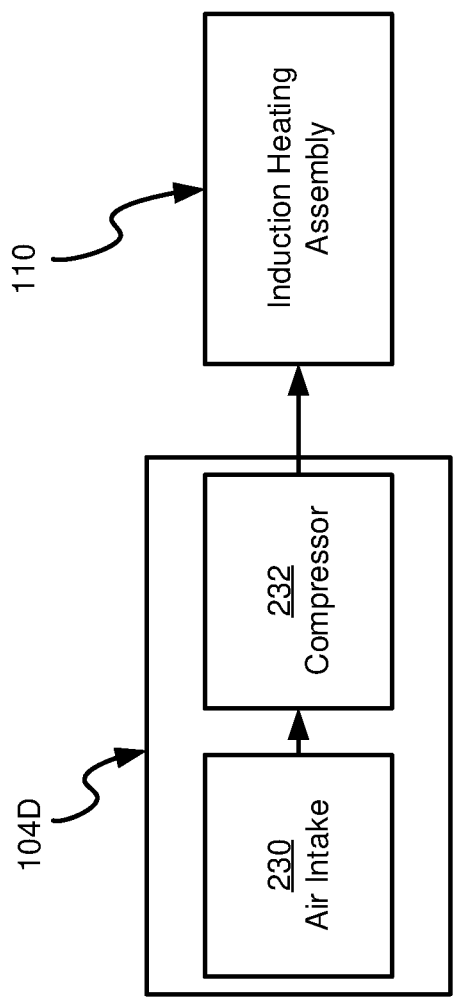
FIG. 2D shows a block diagram of another example fuel supply in the engine of FIG. 1.

FIG. 2D depicts another example fuel supply 104D including an intake 230 and a compressor 232. The intake 230 is configured to intake incoming atmospheric gases and direct the gas into the compressor 232. The compressor 232 is configured to compress the atmospheric gases to provide compressed air as the fuel 108. For example, the compressor 232 may include a series of turbines for compressing the air to increase its temperature and pressure. In an implementation, the atmospheric gas may be combined with an oxidizing electrically conducting fuel thus adding heat and producing thrust. In other examples the compressor 232 may be a cyclonic convection compressor or a scroll compressor. In some examples, the fuel supply 104B may further include a pre-cooler to supercool the atmospheric gas, which is subsequently compressed by the compressor 232.

Figure 3A:
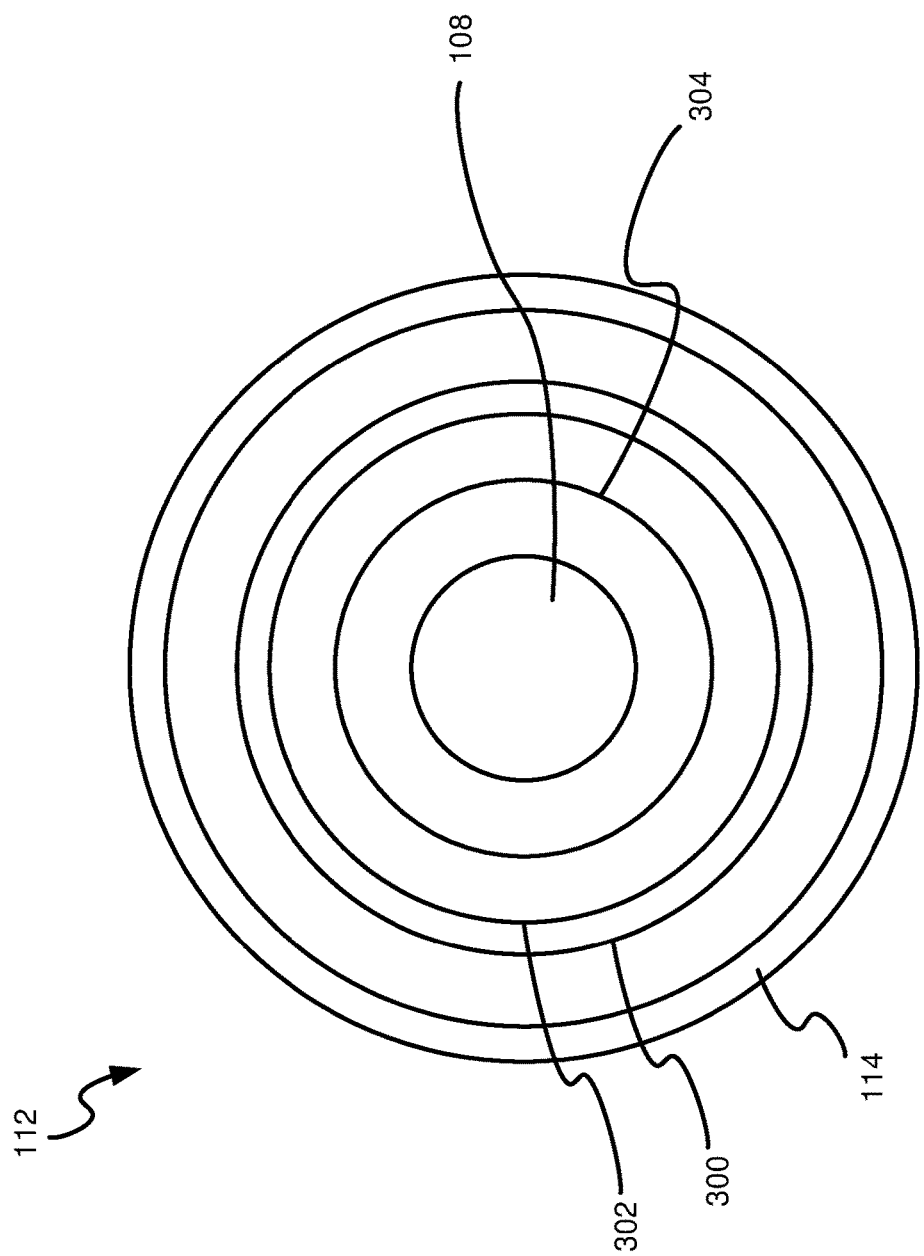
FIG. 3A shows a transverse cross section of an example chamber in the engine of FIG. 1.

Referring now to FIG. 3A, an example transverse cross-section of the chamber 112 is depicted. The chamber 112 includes a quartz tube 300 defining the chamber, a thermal battery 302, and one or more additional layers 304. The chamber 112 is surrounded by a coil 114 of the induction heating assembly 110. The thermal battery 302 is associated with the chamber configured to store and release thermal energy to energize (e.g. to preheat) the fuel 108 in the chamber 112. In particular, the thermal battery 302 may be charged when the engine 100 is on, and may store thermal energy. The thermal battery 302 may subsequently release the stored thermal energy to the fuel 108. For example, the thermal battery 302 may energize the fuel 108 in a pre-heating section of the chamber 112, prior to the fuel proceeding to a combustion section of the chamber 112. In other examples, the thermal battery 302 may supplement the energization of the fuel 108 by the induction heating assembly 110.

The chamber 112 may further include the one or more additional layers 304, including, but not limited to, steel, argon, argon plasma, or other suitable layers of materials to supplement the energization or pre-heating of the fuel 108 in the chamber 112. For example, the additional layer 304 may be steel or another suitable heat exchanger to transfer heat from the thermal battery 302 to the fuel 108. For example, referring to FIG. 3B, an example longitudinal cross-section of the chamber 112 is depicted. In particular, the additional layers 304 are depicted. The engine 100 further includes a plasma tube 310 and a coolant tube 312 associated with the chamber 112. The plasma tube 310 may be configured, for example, to circulate argon plasma adjacent to the chamber 112 containing the fuel 108 to further facilitate energization of the fuel 108. The coolant tube 312 surrounds the plasma tube 310 and may be configured to circulate argon gas or another suitable coolant to manage the dissipation of the thermal energy from the plasma tube 310.

Returning to FIG. 1, the induction heating assembly 110 is generally configured to energize the fuel 108 in the chamber 112 using induction heating. For example, the induction heating assembly 110 may include a coil 114 and a power supplying circuit 116 configured to pass a current through the coil 114, as indicated in FIG. 1 by arrows. The chamber 112 may be cylindrical in shape to allow the coil 114 to be wrapped around the chamber 112. The coil 114 therefore forms a solenoid with the chamber 112 in its center. The power supplying circuit 116 may be an electronic oscillator or other suitably circuitry for passing a high frequency alternating current through the coil 114 to induce a magnetic field 115. In some implementations, the power supplying circuit 116 is further configured to vary the current passing through the coil 114, thereby varying the magnetic field. In other implementations, the coil 114 may be configured to move relative to the chamber 112 to vary the magnetic field. For example, the coil 114 may be coupled to a positioning mechanism to move along a length of the chamber 112, which is stationary. In other examples, the chamber 112 may be coupled to a positioning mechanism to move through the coil 114 which is stationary to vary the magnetic field. In other examples, the induction heating assembly 104 may apply a direct current to the coil 114.

In operation, the power supplying circuit 116 is configured to pass a current through the coil 114. In accordance with Ampere's Law, the current flowing through the coil 114 induces a magnetic field around the coil 114. Further, based on the solenoid shape of the coil 114 being wrapped around the chamber 112, the magnetic fields of each turn of the coil 114 pass through the center of the coil, thereby producing a strong magnetic field at the center of the coil 114 (i.e. in the chamber 112). In accordance with Faraday's Law of Induction, the varying magnetic field induces eddy currents in nearby conductors, and in particular, in the fuel 108. The eddy currents, in turn, flow through the resistance of the fuel 108 to energize the fuel 108. The induction heating assembly 110 is therefore configured to induce eddy currents into the fuel source (or other fuel 108) to induce a reaction with each other, thereby releasing energy. Additionally, eddy current losses are incurred. In particular, the eddy currents which are induced by the electromagnetic field cause a power loss which increases the temperature of the coil.

The induction heating assembly 110 may further induce magnetic hysteresis in the fuel 108. Hysteresis loss is caused by the magnetization and demagnetization of the fuel 108 to produce heat. When magnetic force is applied, the molecules of the fuel 108 are aligned in a first direction. When the magnetic force is reversed, the fuel 108 opposes the reversal of magnetism, resulting in hysteresis loss, and hence heating the fuel 108. In some implementations, induction heating assembly 110 may employ both magnetic hysteresis and induction heating via eddy currents to energize the fuel 108.

The total power loss may thus be computed as the sum of the hysteresis loss, the eddy current loss, and residual loss.

In some implementations, the induction heating assembly 110 may include a superconducting electromagnet. In particular, the coil 114 may include a superconducting material. The induction heating assembly 110 may therefore also include a coolant supply configured to supply a coolant, such as liquid nitrogen or liquid carbon dioxide for cooling the coil 114 below its critical temperature, thereby providing superconductivity including zero electrical resistance and expulsion of magnetic flux fields.

Figure 3B:
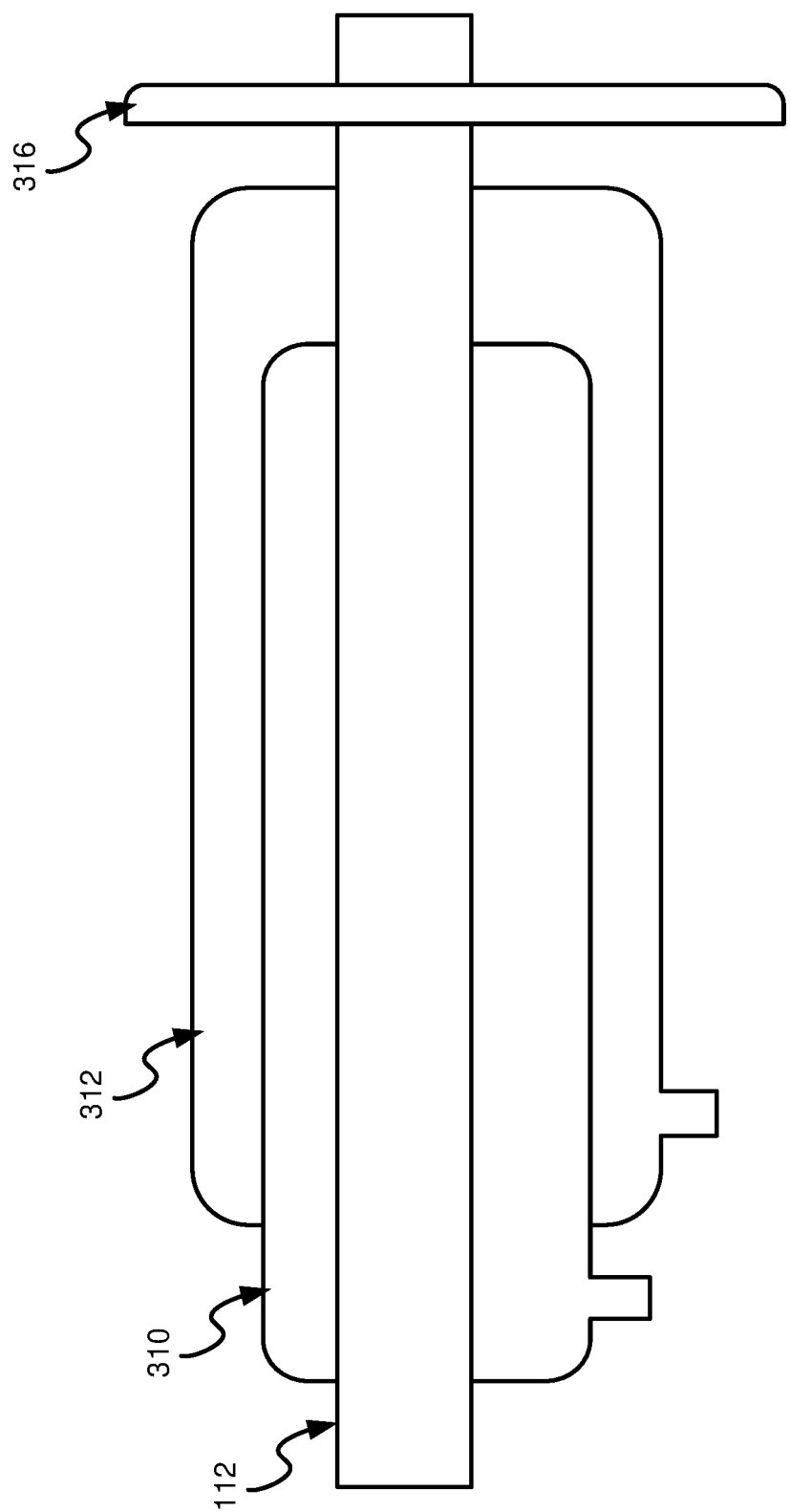
FIG. 3B shows a longitudinal cross section of an example chamber in the engine of FIG. 1.

In some implementations, the induction heating assembly 110 may further include an arrangement of permanent magnets such as a Halbach array 316, as depicted in FIG. 3B. The Halbach array 316 may include a plurality of magnets in a particular arrangement to augment the magnetic field around the chamber 112 and cancel the magnetic field on the opposing side of the Halbach array 316.

Returning again to FIG. 1, the engine further includes the exhaust nozzle 120. The exhaust nozzle 120 is configured to receive the energized fuel 108 from the chamber 112 and convert the energy in the energized fuel 108 into thrust. The nozzle 120 may be cone-shaped, bell-shaped, spike, shaped, or otherwise shaped to produce thrust from the energized fuel. More generally, the material and shape of the nozzle 120 may be selected according to the type of fuel 108 and the application of the engine 100.

In some examples, the exhaust nozzle 120 may include a turbine, for example made of ferromagnetic materials. The turbine may therefore be heated via conduction heating and provide additional thrust as compressed, energized atmospheric gas is expelled through the exhaust nozzle 120.

In some examples, the engine 100 may include further induction heating assemblies applied to various components of the engine 100. For example, the nozzle 120 may include a secondary induction heating assembly configured to inductively heat the nozzle 120 to promote complete combustion of the fuel 108 after being received from the chamber 112. In other implementations, the induction heating assembly may be applied to an electrically conducting series of rotor blades and/or discs that are heated through conduction surface heating and provide thrust by heating a fluid (e.g. atmospheric gases, a compressed fluid, or the like). For example, the chamber 112 may include a ferromagnetic material configured to be heated by the induction heating assembly. The chamber 112 may, in turn, conductively heat the fuel passing through the chamber to energize the fuel. In still further implementations, the secondary induction heating assembly may be applied to the compressor 208 (e.g. the scroll compressor 220) to facilitate compression of the fuel 108.

The engine 100 may further include coolants and/or cooling systems to manage the temperature of various components of the engine 100. In particular, the cooling systems may be employed to maintain the ferromagnetic materials below their Curie temperatures, above which magnetic materials become paramagnetic and lose their magnetic properties. For example, the engine 100 may include microtubule linings in an array to manage the temperature of the components of the engine 100. The microtubule linings may be integrated, for example, with the scroll compressor 220. In other examples, the cooling systems can include a nitrogen cooling wrapping, liquid nitrogen, circulating water, or other suitable coolants.

Figure 4:
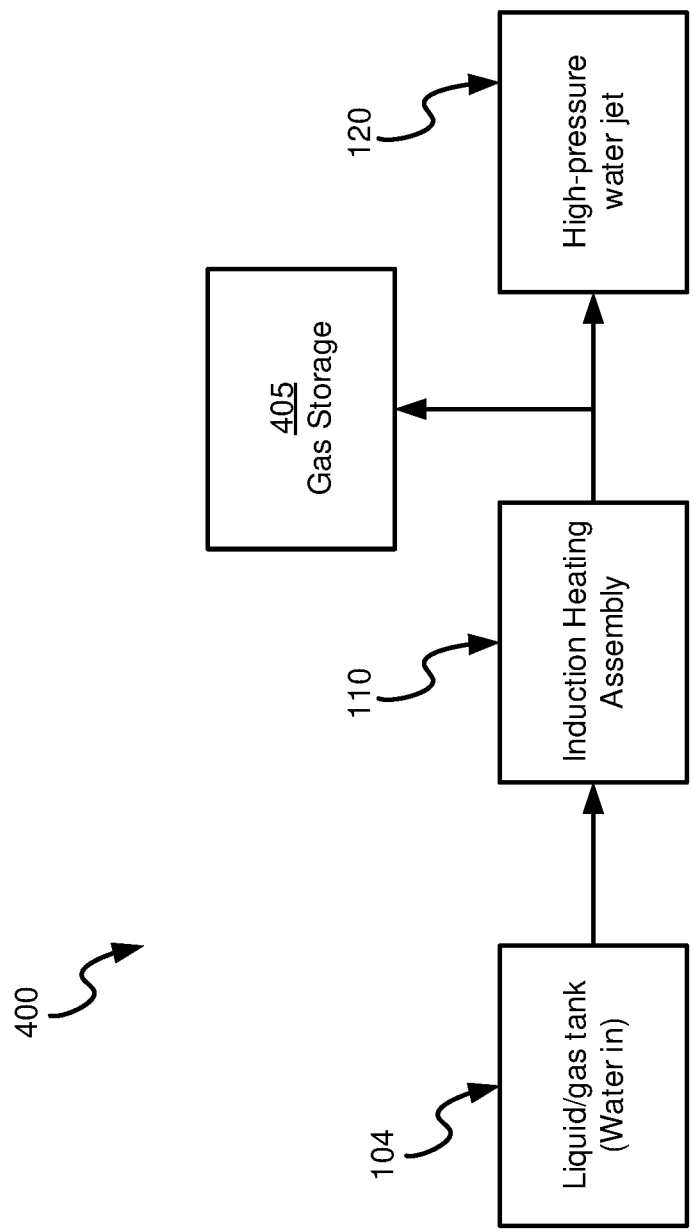
FIG. 4 shows a block diagram of another example engine, according to a non-limiting embodiment.

FIG. 4 depicts another example engine 400. The engine 400 includes the fuel supply 104, the induction heating assembly 110, and the exhaust nozzle 120 as described above. In the engine 400, the fuel supply 104 includes various water pump components, including, but not limited to: a storage system, condenser, turbines, motors, feed pumps, and the like. In particular, the fuel supply 104 is configured to supply water as the electrically conducting fuel 108. The induction heating assembly 110 of the engine 400 is configured to heat the water to produce steam as the energized fuel. The steam and air from the water may be separated from the induction heating assembly 110 and stored in a gas storage 405. Additionally, at least a portion of the steam is directed towards the exhaust nozzle 120 which includes various components including, but not limited to: a turbine, a reduction gearing, a throttle, an electric propulsion motor, and the like. In particular, the exhaust nozzle 120 is configured to use the steam to produce thrust, for example via a high-pressure water jet.

Figure 5:
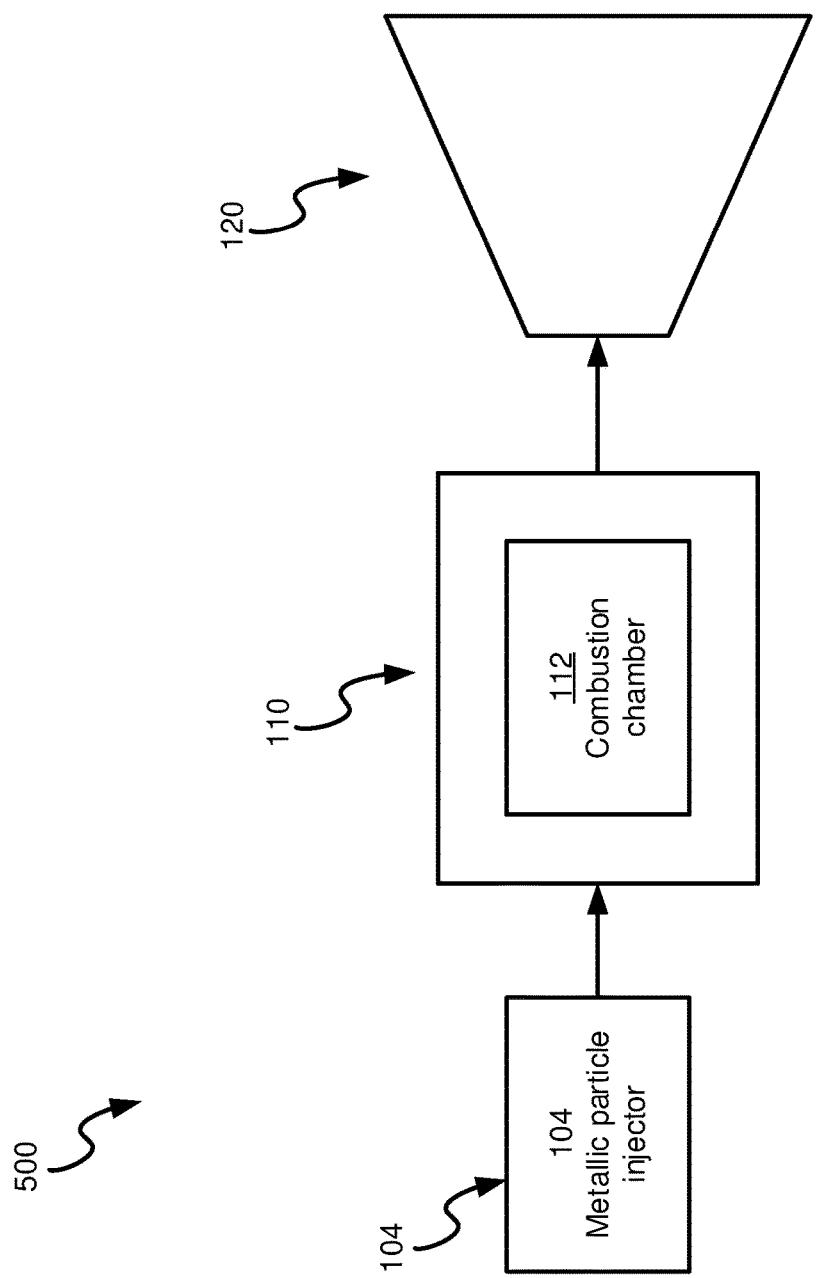
FIG. 5 shows a block diagram of another example engine, according to a non-limiting embodiment.

FIG. 5 depicts another example engine 500. The engine 500 may be used for example in a single stage to orbit rocket application. The engine 500 includes the fuel supply 104, the induction heating assembly 110, and the exhaust nozzle 120 as described above. In the engine 500, the fuel supply 104 includes a metallic particle injector configured to inject metallic particles into the induction heating assembly 110. The induction heating assembly 110 is configured to energize the metallic particles, which are subsequently received at the exhaust nozzle 120 to produce thrust.

Figure 6A:
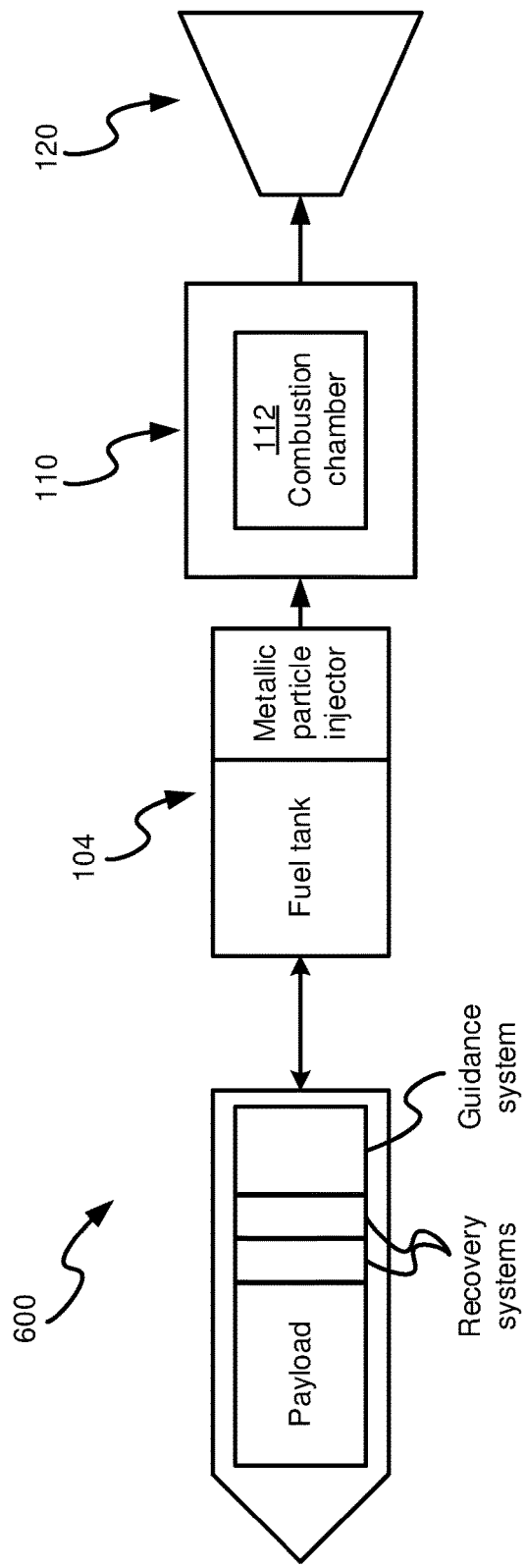
FIGS. 6A and 6B show block diagrams of further example engines, according to non-limiting embodiments.
Figure 6B:
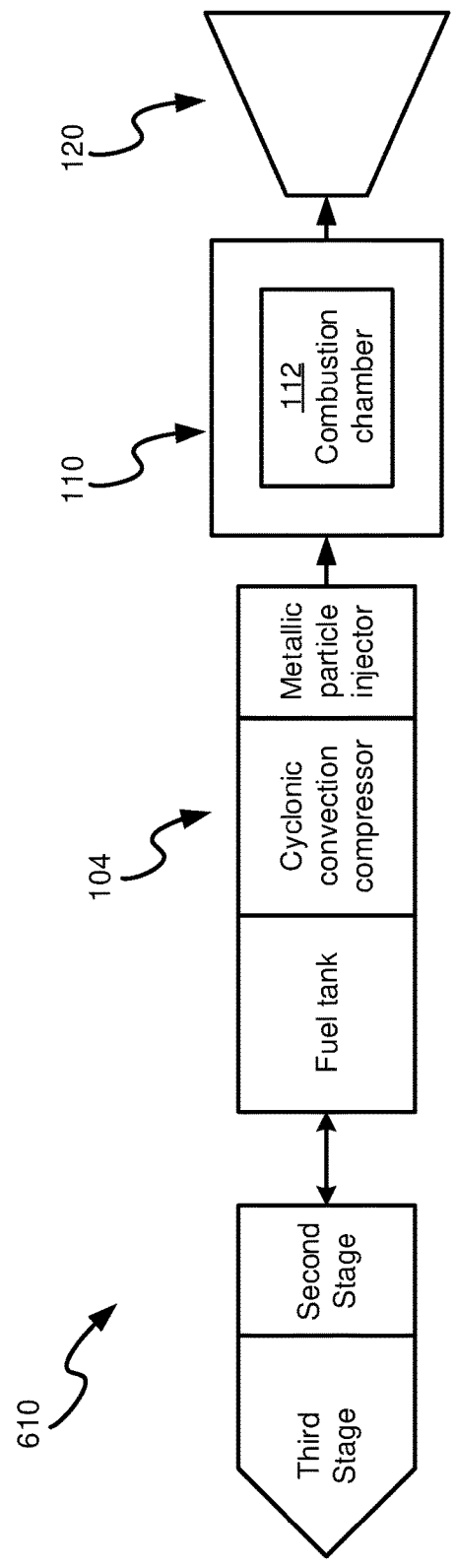

FIGS. 6A and 6B depict further example rockets 600 and 610. These rockets include engines similar to the engine 500, which include the fuel supply 104, including a particle injector, the induction heating assembly 110 and the exhaust nozzle 120. In particular, the engines 600 and 610 may be used for single-stage and multi-stage rocket applications. Hence, the rockets 600 and 610 include a payload and may further include staged loads for propelling the payload into orbit.

The present disclosure provides an engine for providing thrust using induction heating and sintering processes. In particular the engine energizes an electrically conducting fuel by way of rapidly alternating eddy currents produced by alternating magnetic fields. The energized fuel is converted to thrust by an exhaust nozzle. The engine may therefore be used as a propulsion system to provide thrust or may be used as a thrust augmenter to increase thrust in an existing system. For example, the engine may be applied to a single-stage or multi-stage rocket boosting system.

In still further examples, the engine energizes an electrically conducting fuel by rotating particles at a high rate in direct current electromagnetic fields and/or rapidly alternating eddy currents produced by alternating magnetic fields. The energized fuel undergoes combustion and/or sintering producing thrust by an exhaust nozzle. In other examples, magnetic materials such as turbine blades are fixed in an alternating current electromagnetic field, where heat generation occurs when the material magnetic orientation is switching by either by rotating the materials itself in a direct current electromagnetic field and/or by alternating the magnetic field around the material.

In other implementations, the engine may be applied as a thrust augmenter coupled with other propulsion systems to create multi-stage thrusters. For example, induction heating may be used to increase temperatures in the combustion chamber of another propulsion system to augment thrust, other propulsion systems include but not limited to chemical-based engines, arcjets, Hall thrusters, ion engines, pulsed plasma, electrically and thermally heated thrusters and the like. In another example, an induction induced refrigeration cycle, may create cold air to be pumped into the nozzle, causing a "Bernoulli effect." The reduction of pressure occurs perpendicular the direction of flow, resulting in thrust augmentation. In further examples, the engine may be used in conjunction with electrically and thermally heated thrusters to augment thrust.

In still further implementations, the engine may be employed in conjunction with further power generation systems. For example, the engine may be used in conjunction with power generation systems employing one or more of: cogeneration, trigeneration and multigeneration of cooling, heating, power, propulsion, and industrial products. In particular, the engine may drive other processes to enable generation of heat and power.

Figure 7:
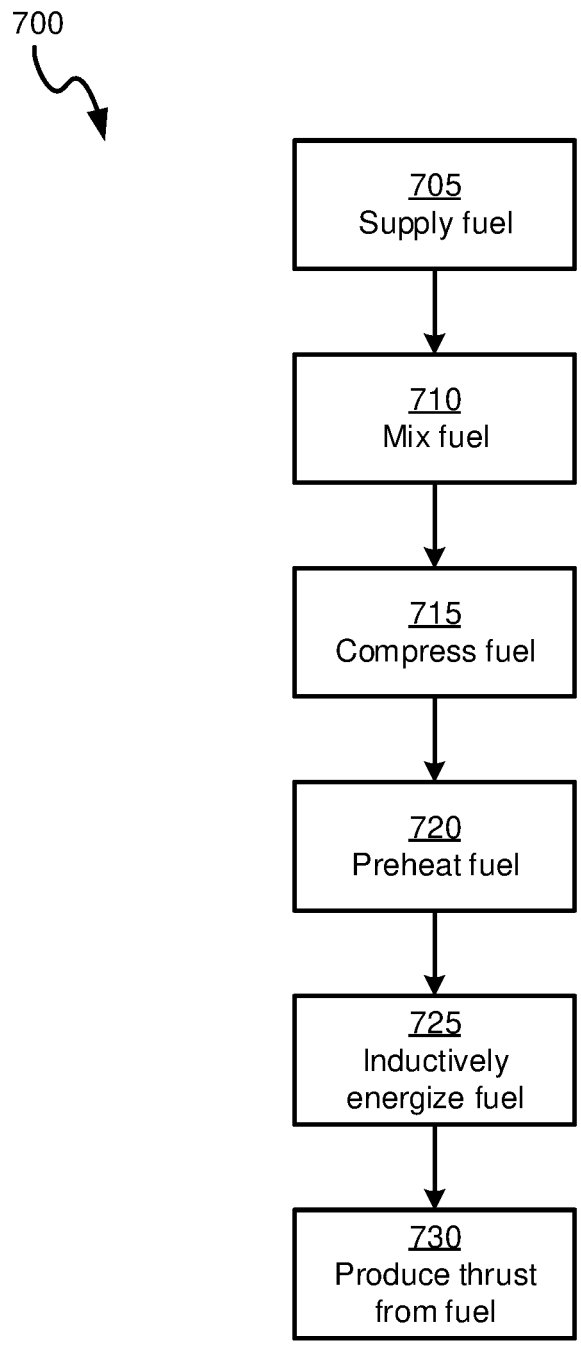
FIG. 7 shows a flowchart of an example method of producing thrust in the engine of FIG. 1.

Referring now to FIG. 7, a flowchart of a method 700 of producing thrust in an induction engine is depicted. In order to assist in the explanation of the method 700, it will be assumed that the method 700 is performed using the engine 100, although it is contemplated that the method 700 may also be performed by other suitable systems, such as, but not limited to, the engine 400, the engine 500, the engine 600, or the engine 610.

At block 705, the fuel 108 is supplied, for example, from the primary tank 200.

At block 710, the fuel 108 is mixed, via the mixing system 206, with one or more secondary fuels, working fluids and/or one or more catalysts. In particular, the processor may determine, based on the desired heating, combustion and/or propulsion profiles, the secondary fluids to be mixed with the fuel 108. The processor may then control the corresponding control valves to allow the determined secondary fluids to flow to the main line 202 for mixing with the fuel 108.

At block 715, the fuel 108 is compressed by the compressor 208. For example, the fuel 108 may enter the cyclonic convection compressor 210 and be driven by the wings 218 and the fins 216 to become compressed. In other examples, the fuel 108 may enter the scroll compressor 220, and in particular, the space between the fixed scroll 222 and the orbiting scroll 224. As the orbiting scroll 224 rotates, the fuel 108 is compressed between the two scrolls 222 and 224.

At block 720, the fuel 108 is pre-heated. In particular, the thermal battery 302 may release stored energy to pre-heat the fuel 108. In other examples, the fuel 108 may be pre-heated via thermal exchange with plasma or the like circulating in the plasma tube 310. More generally, the fuel 108 is pre-heated based on the heating, combustion and/or propulsion profiles desired. For example, the fuel 108 may be pre-heated at block 720 to just under combustion temperature to allow for rapid and consistent combustion.

At block 725, the fuel 108 is energized inductively via the induction heating assembly. In particular, the fuel 108 may be heated to combustion.

At block 730, the energy from the fuel 108 is converted by the exhaust nozzle 120 to produce thrust. For example, the nozzle 120 may allow the energized fuel 108 to expand and be expelled to produce thrust.

In some examples, some or all of blocks 710, 715, and 720 may be performed in different orders, or may be skipped entirely.

In some implementations, the induction heating assembly 110 may further include regenerative heat exchangers to cycle the exhaust products from a plurality of turbines to heat and energize the fuel 108.

In some examples, fuel 108 is inductively heated to combustion. In other examples, electrically conductive fuel 108 is subjected to sintering (e.g. heating without liquefaction). other examples, where fuel 108 is composed of multiple materials, a combination of combustion and sintering may be achieved.

In some implementations, fuel 108 products, may be produced by combining one or more user defined fuel sources in the presence of a catalyst in the induction heating assembly. Precise temperature control to induce a reaction is achieved using the Curie temperature of materials in the fuel and/or catalyst sources. In other examples, the fuel 108 is injected into the induction heating assembly 120, the energized fuel reacts with a catalyst bed, the heat and products from the reaction expand and are expelled to produce power and thrust through the nozzle 120.

In other implementations, a linear array of co-axial magnets may be used to confine plasma in the chamber. The array may be surrounded by induction coils tuned to energize the respective micro- and/or nano-particles and heat via induction and/or sintering. Secondary fuels and/or catalysts may be added to increase the temperature of the confined plasma. A secondary fluid is energized, the working fluid, is then pumped through the assembly undergoing a phase change or combustion and/or sintering. Magnetic mirrors and magnetic nozzles may be used to direct the energized products to expand and be expelled to produce thrust through the nozzle 120. The induction heating assembly 110 may also be combined with a power generation system to use the wasted heat from the energized fuel 108 to generate electricity, and furthermore configured to store power in an energy storage system.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. An engine comprising:
    a fuel supply to supply a fuel, wherein the fuel is an electrically conducting fuel, including a reactive metal compound, wherein the fuel includes a micro/nano-thermite;
    a chamber fluidly coupled to the fuel supply to receive the fuel;
    an induction heating assembly operatively coupled to the chamber to inductively energize the fuel in the chamber;
    wherein the induction heating assembly includes a coil and a power supplying circuit configured to pass a current through the coil, wherein the power supplying circuit is an electronic oscillator or other suitable circuitry for passing a high frequency alternating current through the coil to induce a magnetic field; and
    wherein the power supplying circuit is further configured to vary the current passing through the coil, thereby varying the magnetic field, wherein the varying magnetic field induces eddy currents in nearby conductors, and in particular, in the fuel, wherein the eddy currents, in turn, flow through the resistance of the fuel to energize the fuel; and
    an exhaust nozzle coupled to the chamber to receive energized fuel from the chamber to produce thrust.

2. The engine of claim 1, wherein the fuel supply comprises a primary tank to contain the fuel and a pump to pump the fuel from the primary tank to the chamber.

3. The engine of claim 2, wherein the fuel supply further comprises a mixing system including one or more secondary tanks to contain secondary fluids, each secondary tank having a corresponding control valve to control a flow of a respective secondary fluid.

4. The engine of claim 3, wherein the secondary fluids are secondary fuels or catalysts.

5. The engine of claim 2, wherein the fuel supply further comprises a compressor to compress the fuel.

6. The engine of claim 5, wherein the compressor comprises one or more of: a convection compressor and a scroll compressor.

7. The engine of claim 1, wherein the fuel supply comprises an intake and a compressor.

8. The engine of claim 7, wherein the compressor comprises one or more of: a convection compressor and a scroll compressor.

9. The engine of claim 1, further comprising a thermal battery associated to store thermal energy and release the stored thermal energy to energize the fuel.

10. The engine of claim 1, further comprising:
    a plasma tube associated with the chamber to circulate plasma adjacent to the chamber to facilitate energization of the fuel; and
    a coolant tube associated with the chamber and surrounding the plasma tube, the coolant tube configured to circulate a coolant to manage dissipation of thermal energy from the plasma tube.

11. The engine of claim 1, further comprising an arrangement of permanent magnets to augment a magnetic field produced by the induction heating assembly.

12. The engine of claim 1, further comprising a secondary induction heating assembly configured to inductively heat the exhaust nozzle.

13. The engine in claim 1, further comprising regenerative heat exchangers to heat and energize the fuel.

14. The engine in claim 1, wherein the induction heating assembly is configured to energize the fuel by applying one or more of: a high frequency alternating current and a direct current.

15. The engine in claim 1, further comprising a further power generation system.

16. The engine of claim 15, wherein the further power generation system employs one or more of: cogeneration, trigeneration and multigeneration of cooling, heating, power, propulsion, and industrial products.

17. The engine in claim 1, wherein the induction heating assembly is further configured to energize the fuel via sintering.

18. A method in an induction engine, the method comprising:
    receiving, in a chamber, a fuel, wherein the fuel is an electrically conducting fuel, including a reactive metal compound, wherein the fuel includes a micro/nano-thermite;
    inductively energizing the fuel using an induction heating assembly, wherein the induction heating assembly includes a coil and a power supplying circuit configured to pass a current through the coil, wherein the power supplying circuit is an electronic oscillator or other suitable circuitry for passing a high frequency alternating current through the coil to induce a magnetic field; and
    wherein the power supplying circuit is further configured to vary the current passing through the coil, thereby varying the magnetic field, wherein the varying magnetic field induces eddy currents in nearby conductors, and in particular, in the fuel, wherein the eddy currents, in turn, flow through the resistance of the fuel to energize the fuel; and
    at an exhaust nozzle of the engine, producing thrust from the energized fuel.

19. The method of claim 18, further comprising, prior to energizing the fuel, pre-heating the fuel using a thermal battery.

20. The method of claim 18, further comprising, prior to energizing the fuel, compressing the fuel.

21. The method of claim 20, wherein the fuel is compressed using one or more of a cyclonic convection compressor and a scroll compressor.

22. The method of claim 18, further comprising, prior to energizing the fuel, mixing the fuel with a secondary fuel.

23. The method of claim 18, further comprising, prior to energizing the fuel, mixing the fuel with a catalyst.

* * * * *

UNITED STATES PATENT AND TRADEMARK OFFICE
CERTIFICATE OF CORRECTION

| | |
|---|---|
| PATENT NO. | : 11,821,367 B2 |
| APPLICATION NO. | : 17/273234 |
| DATED | : November 21, 2023 |
| INVENTOR(S) | : Haroon B. Oqab and George B. Dietrich |

Page 1 of 1

It is certified that error appears in the above-identified patent and that said Letters Patent is hereby corrected as shown below:

In the Claims

Claim 21, Column 10, Lines 56 and 57:
"...using one or more of a cyclonic convection compressor and a scroll compressor."
Should read:
-- using one or more of a convection compressor and a scroll compressor. --

Signed and Sealed this
Twenty-seventh Day of August, 2024

Katherine Kelly Vidal
*Director of the United States Patent and Trademark Office*